United States Patent
Shih

(10) Patent No.: US 7,273,994 B2
(45) Date of Patent: Sep. 25, 2007

(54) ELECTRICAL DISCHARGE MACHINE FOR IMPROVING THE GUIDE ALIGNMENT BASE STRUCTURE

(75) Inventor: Chiao-chin Shih, Chang Hua (TW)

(73) Assignee: Castek Mechatron Industry Co., Ltd., Chang Hua (TW)

(*) Notice: Subject to any disclaimer, the term of this patent is extended or adjusted under 35 U.S.C. 154(b) by 0 days.

(21) Appl. No.: 10/979,207

(22) Filed: Nov. 3, 2004

(65) Prior Publication Data
US 2006/0091114 A1  May 4, 2006

(51) Int. Cl.
*B23H 7/26* (2006.01)
(52) U.S. Cl. .................. 219/69.15; 403/83; 403/90; 403/362
(58) Field of Classification Search ............. 219/69.15; 242/615, 615.2, 615.21; 403/83, 90, 362
See application file for complete search history.

(56) References Cited

U.S. PATENT DOCUMENTS

| | | | | |
|---|---|---|---|---|
| 3,818,797 A | * | 6/1974 | Zettler | 409/233 |
| 4,751,362 A | * | 6/1988 | Girardin | 219/69.12 |
| 5,214,260 A | * | 5/1993 | Fricke | 219/69.12 |
| 5,847,350 A | * | 12/1998 | Dorrel et al. | 219/69.15 |
| 2003/0192861 A1 | * | 10/2003 | Lin | 219/69.2 |

FOREIGN PATENT DOCUMENTS

| | | | |
|---|---|---|---|
| DE | 4133761 A1 | * | 4/1993 |
| JP | 62-162430 A | * | 7/1987 |
| JP | 2002-283157 A | * | 10/2002 |

* cited by examiner

*Primary Examiner*—Geoffrey S. Evans
(74) *Attorney, Agent, or Firm*—Troxell Law Office, PLLC

(57) ABSTRACT

An electrical discharge machine for improving the guide alignment base structure consisting of a guide alignment base having vertical threaded holes. Furthermore, the guide alignment base has axial adjustment holes that are respectively aligned with the vertical threaded holes, the diameters of the axial adjustment holes slightly larger than the diameters of the vertical threaded holes to enable the insertion of adjustment screws through the axial adjustment holes and fastening into the vertical threaded holes. With a spherical body in between serving as a center, the adjustment screws tilt the guide alignment base forward, backward, leftward, and rightward to adjust the perpendicularity of the guide. Horizontal adjustment screws through the guide alignment base secure the guide alignment base transversely such that the guide alignment base effectively achieves stable positioning to thereby prevent the vertical and horizontal deviation of the guide alignment base when it is impacted.

11 Claims, 6 Drawing Sheets

FIG. 1-A
PRIOR ART

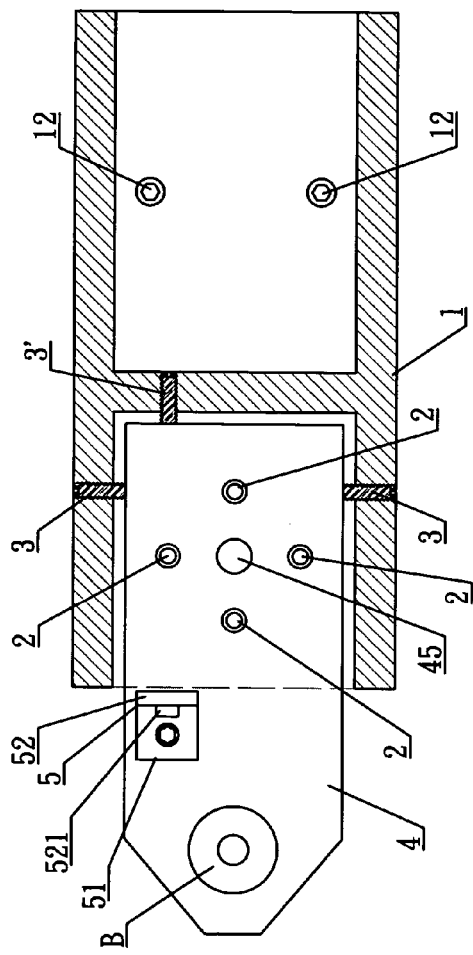
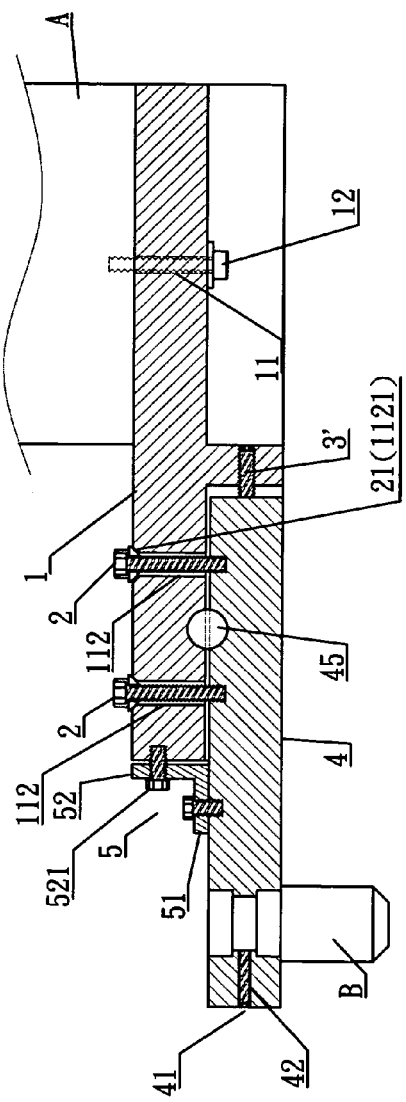
FIG. 5
FIG. 4

ELECTRICAL DISCHARGE MACHINE FOR IMPROVING THE GUIDE ALIGNMENT BASE STRUCTURE

BACKGROUND OF THE INVENTION

1. Field of the Invention

The invention herein relates to an electrical discharge machine for improving the guide alignment base structure, specifically a structure that provides for fastened positioning after alignment the guide, thereby preventing deviation due to impact.

2. Description of the Prior Art

Conventional electrical discharge machine for the guide alignment base structure generally includes of the following approaches:

Referring to FIG. 1 and FIG. 1-A, the guide alignment base 10 is conjoined onto the elevating base A, and the structure is as follows:
1. The said guide alignment base 10 has oblong shape holes 101.
2. Threaded holes 102 are disposed in a lengthwise and widthwise, cross-shaped symmetrical configuration along the periphery of the said oblong shape holes 101.
3. Mounting screws 103 are respectively inserted through the said oblong shape holes 101 and each is screwed into threaded holes 102 which, at the same time, along with the said adjustment screws 104 at four positions in a cross-shaped symmetrically configuration, are utilized to articulate forward and backward against the elevating base A bottom section, enabling the minor adjustment of the perpendicularity of the guide situated in the guide base 10.
4. When perpendicularity is adjusted to the exact position, at the same time utilizing the elongated holes 101, the guide base 10 mounting screws 103 limit the position, with the function of the elongated holes 101 enabling the guide alignment base 10 to provide for the minor adjustment of guide perpendicularity.
5. After the said adjustment to exact position is completed, the mounting screws 103 are fastened into place.

SUMMARY OF THE INVENTION

I. Problems Requiring Solution
1. The said guide alignment base consists of two mounting screws that are vertically fastened but deficient in horizontally oriented positioning capability such that subjecting the guide alignment base to impact easily causes the guide alignment base to develop horizontal shifting.
2. The said guide alignment base is directly supported by two mounted screws and at the adjustment screws in a cross-shaped symmetrically configuration; since forward and backward control between them is insufficient, adjustment to the exact position is difficult, with adjustment to the exact position involving a considerable waste of time.

II. Means of Solution

The two embodiments of the invention herein are approaches capable of solving the said problems 1. The First Embodiment Consists of a U-shaped alignment base conjoined to an elevating base having a alignment trough below, with the said guide alignment base placed in the said alignment trough; four vertical adjustment screws in a cross-shaped symmetrical configuration are inserted through the vertical holes of the U-shaped alignment base and fastened to vertical threaded holes in the guide alignment base and, at the same time, a spherical body is situated at the center positions of the cross-shaped symmetrically arrayed vertical holes and vertical threaded holes; the said vertical adjustment screws adjust the perpendicularity of the guide alignment base, utilizing the said spherical body at the center for tilting, thereby providing for flexible and easier adjustment that shortens adjustment time; horizontal adjustment screws at the sides of the said U-shaped alignment base are fastened into horizontal threaded holes to bring the U-shaped alignment base against the sides and provide for the horizontal adjustment and positioning of the U-shaped alignment base; and disposed between the alignment trough opening and the guide alignment base is a positioning block, one extremity of which is attached onto the guide alignment base, with the opposite extremity screw fastened to the alignment trough entrance edge, enabling the guide alignment base to be even more stably positioning at the alignment trough, thereby preventing deviation from the exact position when the guide alignment base is subjected to impact.

2. The Second Embodiment

Consists of a collet mounting plate that is directly conjoined onto the elevating base; an accurate surface is formed at the bottom section of the guide plate such that the said actuate surface is placed in the said accurate alignment receptacle, vertical threaded holes are disposed in cross-shaped symmetry along the outer periphery of the said guide plate aligned with vertical threaded holes on the mounting plate, and vertical adjustment screws are inserted through the vertical holes and fastened to the vertical threaded holes; utilizing the said accurate surface and the said accurate alignment receptacle, the vertical adjustment screws adjust the perpendicularity of the collet, collet mounting screws at the side penetrate the guide plate and are tightened against the collet to position it, thereby providing for the rapid adjustment and exact positioning of the collet.

BRIEF DESCRIPTION OF THE DRAWINGS

FIG. 1-A is an orthographic drawing of the conventional guide alignment base.

FIG. 4 is a cross-sectional drawing of the first embodiment of the invention herein.

FIG. 5 is a cross-sectional drawing of the first embodiment of the invention herein.

DETAILED DESCRIPTION OF THE PREFERRED EMBODIMENTS

Figure 1:
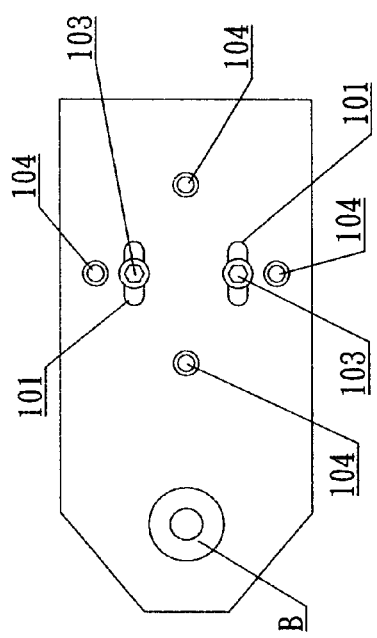
FIG. 1 is a cross-sectional drawing of a conventional guide alignment assembled to the elevating base of an electric discharge machine.
Figure 1:
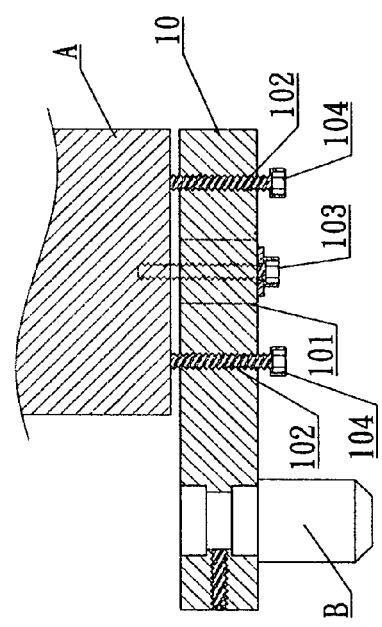
Figure 2:
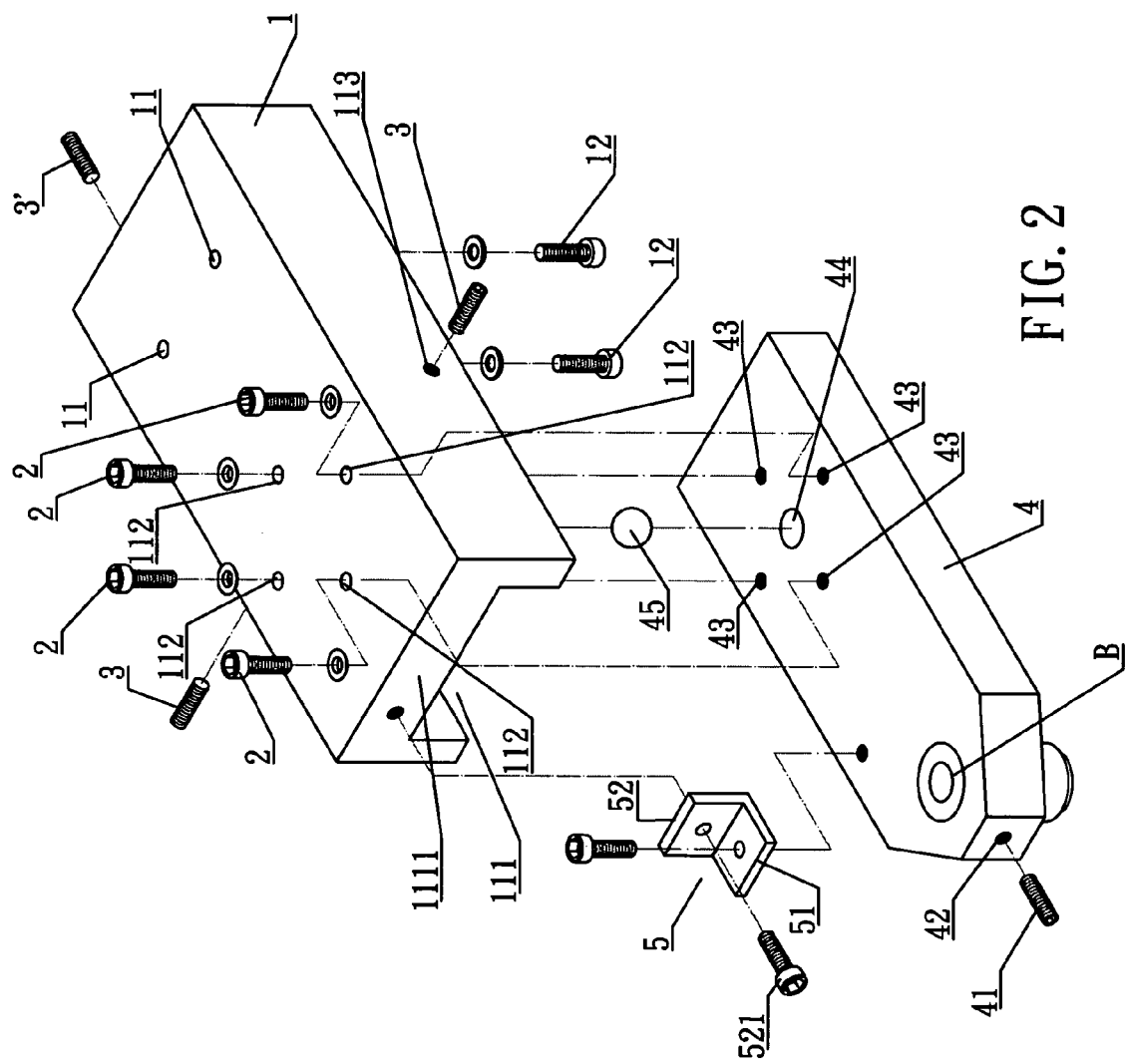
FIG. 2 is an exploded drawing of the first embodiment of the invention herein.
Figure 3:
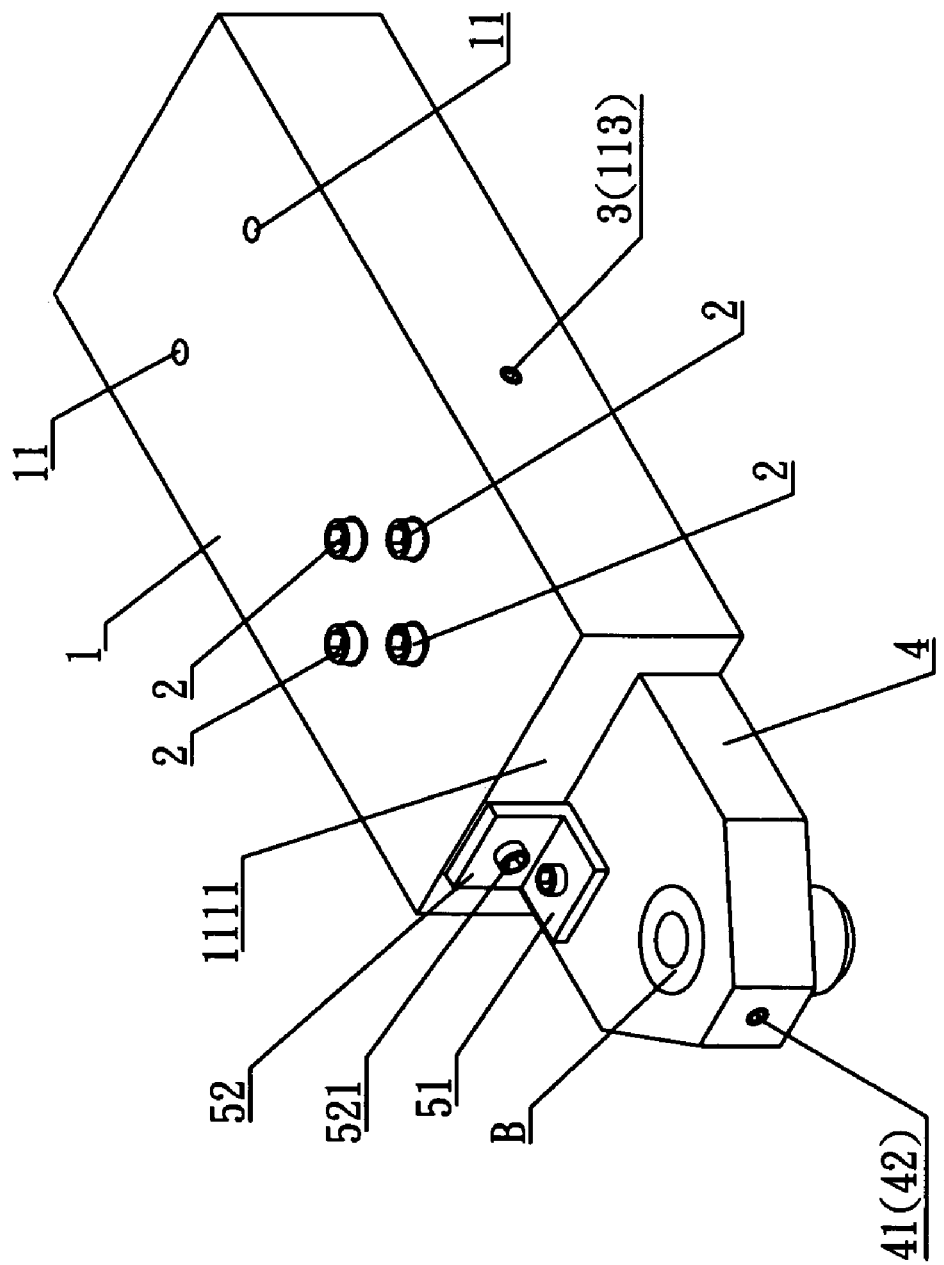
FIG. 3 is an isometric drawing of the first embodiment of the invention herein.
Figure 6:
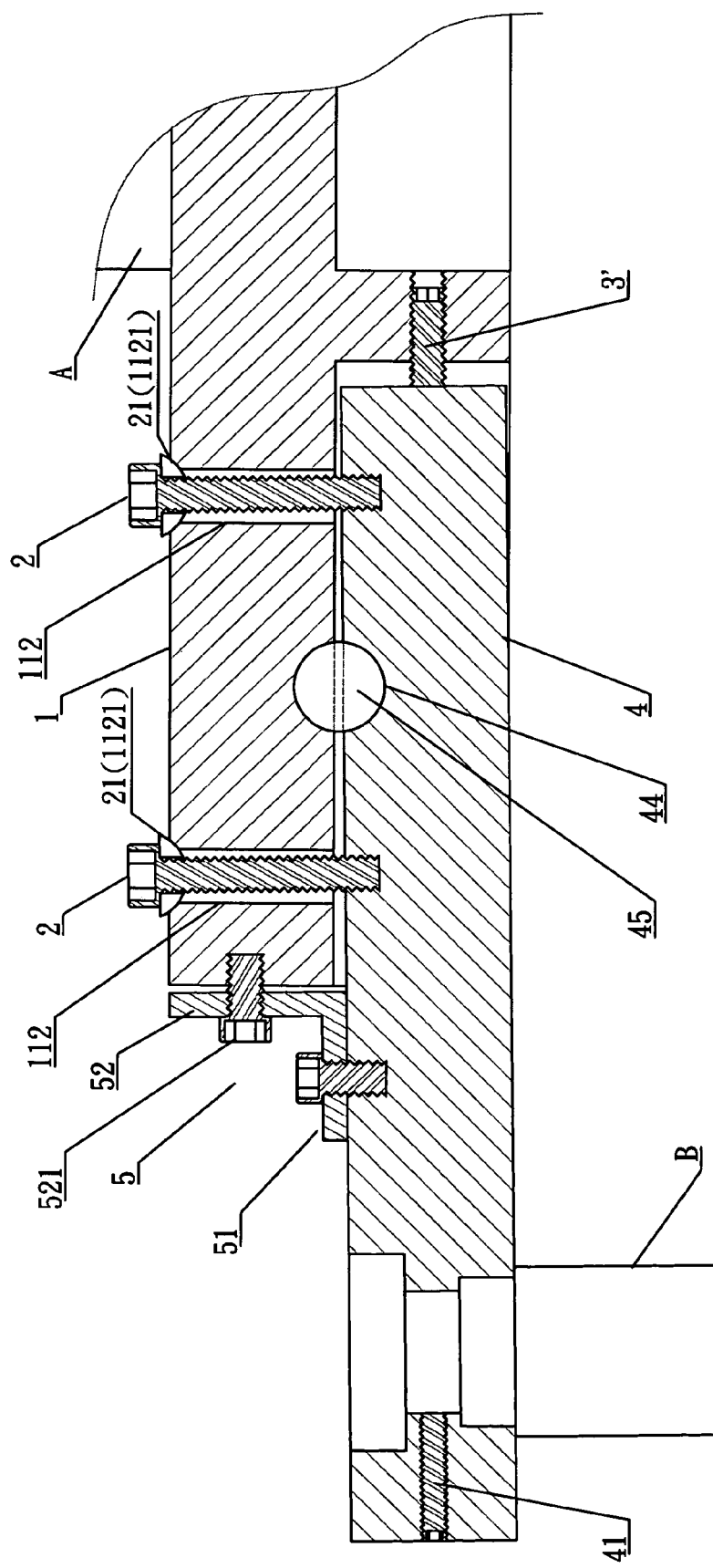
FIG. 6 is a cross-sectional drawing of the first embodiment adjustment state of the invention herein.

The following is an elaboration of the technological content and operation of the present invention.

The first embodiment of the invention herein, referring to FIG. 2, FIG. 3, FIG. 5, and FIG. 6, consists of a U-shaped alignment base 1, its rear end having two mounting holes 11 enabling the insertion of two mounting screws 12 into the said mounting holes 11 for fastening firmly onto an elevating base A; the said U-shaped alignment base 1 has a alignment trough 111 as well as vertical holes 112 disposed in a lengthwise and widthwise, cross-shaped configuration at an appropriate location at the front end, the diameters of the said vertical holes 112 slightly larger than the outer diameters of vertical adjustment screws 2, enabling the free tilt articulation of the vertical adjustment screws 2 respectively inserted in the vertical holes 112; the said U-shaped alignment base 1 has horizontal threaded holes 113 through its sides, the said horizontal threaded holes 113 penetrating the two sides are situated in an opposed state and, furthermore, at minimum in line with one vertical hole 112 such that when horizontal adjustment screws 3 are fastened into the horizontal threaded holes 113 and tightened against the sides of the said U-shaped alignment base 1, thereby preventing guide plate 4 movement.

A guide alignment base 4 having a guide B at its front end, with a guide mounting screw 41 fastened into a threaded hole 42 that firmly positions the guide B; the said guide alignment base 4 has vertical threaded holes 43 disposed in a cross-shaped symmetrical formation at its rear end that correspond to the vertical holes 112 of the U-shaped alignment base 1 and, furthermore, a locating seat 44 is formed at the center of the said vertical threaded holes 43 and a spherical body 45 is nested on the said locating seat 44, enabling the placement of the guide alignment base 4 in the said U-shaped alignment base 1 alignment trough 111 with the said spherical body 45 situated between the center positions of the cross-shaped symmetrically arrayed vertical holes 112 and the cross-shaped symmetrically arrayed vertical threaded holes 43.

A positioning block 5, one extremity of which is a fixed end 51 and the opposite extremity is an affixing end 52; the said fixed end 51 is attached onto the guide alignment base 4, the said affixing end 52 is separated from the alignment trough 111 entrance edge 1111 by an appropriate interval, and a set screw 521 is utilized for fastening it to the entrance edge 1111 of the U-shaped alignment base 1 alignment trough 111, thereby providing for the admission of the positioning block 5 into the guide alignment base 4 alignment trough 111 and, furthermore, the said set screw 521 and the axially oriented horizontal screws 3 are in an opposed state and at minimum in line with one vertical hole 112.

Referring to FIG. 3, FIG. 4, FIG. 5, and FIG. 6, when the said guide alignment base 4 is adjusted so that the guide B attains perpendicularity, the spherical body 45 is utilized as a center, the four vertical adjustment screws 2 are individually adjusted to angularly tilt the guide alignment base 4 in four directions such that after the guide B is in the exact position, the horizontal adjustment screws 3 fastened into the horizontal threaded holes 113 at the side of the U-shaped alignment base 1 are tightened against the sides of the guide alignment base 4, thereby positioning the guide alignment base 4 within the U-shaped alignment base 1 alignment trough 111; to prevent the movement of the guide alignment base 4 due to impact, the positioning block 5 set screw 521 is utilized to shove the guide alignment base 4 towards the inside of the said alignment trough 111 such that the guide alignment base 4 is stably clamped into position from four directions which effectively prevents dislocation when impacted.

Figure 7:
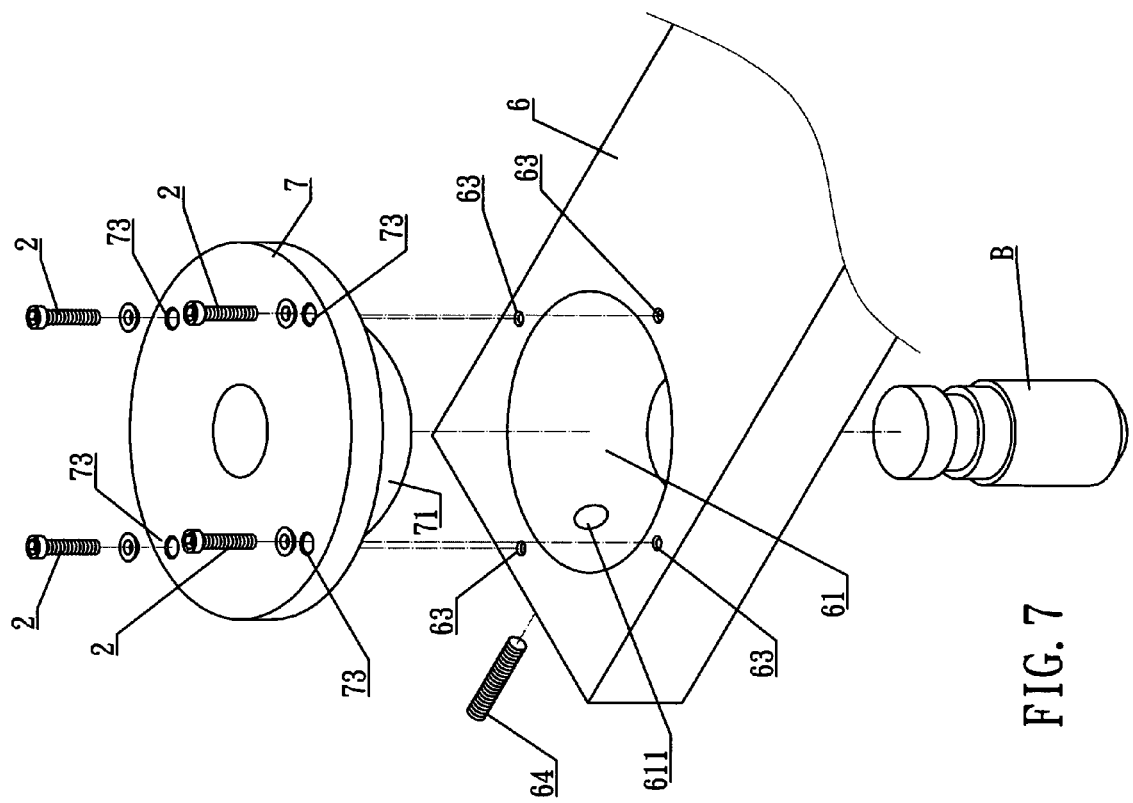
FIG. 7 is an exploded drawing of the second embodiment of the invention herein.
Figure 8:
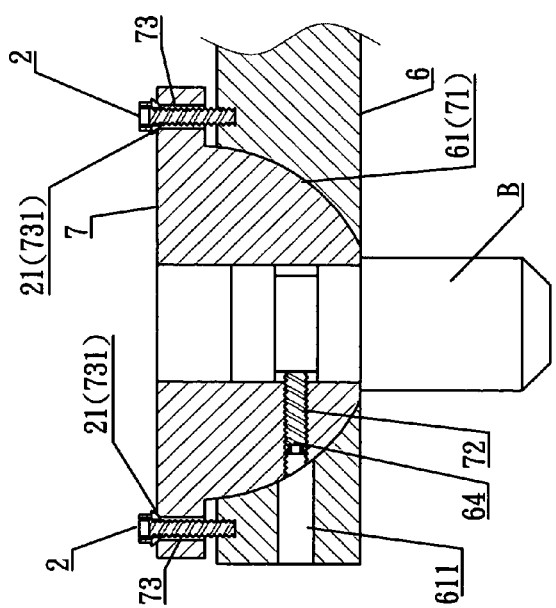
FIG. 8 is a cross-sectional drawing of the second embodiment of the invention herein.

The second embodiment of the invention herein, referring to FIG. 7 and FIG. 8, consists of a guide mounting plate 6 that is directly conjoined onto the elevating base A (as shown in FIG. 1), and which has an accurate alignment receptacle 61 formed in the front end as well as a passage 611 horizontally disposed through the interior of the said accurate alignment receptacle 61; a guide alignment base 7 with a aligning accurate surface 71 along the bottom section and, furthermore, a threaded hole 72 horizontally penetrating the aligning accurate surface 71, the diameter of the said passage 611 considerably larger than the hole diameter of the said threaded hole 72 such that when the guide alignment base 7 aligning accurate surface 71 is placed into the said accurate alignment receptacle 61, the said passage 611 is in continuity with the said threaded hole 72 and, furthermore, as minor adjustment is effected at the threaded hole 72, all positions are within the range of the said passage 611; vertical threaded holes 63 are disposed in cross-shaped symmetry along the outer periphery of the said guide mounting plate 6 accurate alignment receptacle 61 in alignment with vertical holes 73 on the guide alignment base 7 and, at the same time, the hole diameters of the said vertical holes 73 are slightly larger than outer diameters of the said vertical threaded holes 63 such that when the vertical adjustment screws 2 at the guide alignment base 7 articulate perpendicularity, the vertical adjustment screws 2 accommodated by the said vertical holes 73 are capable of a predetermined amount of angular variation therein and at the same time defines the inclination of the guide alignment base 7 aligning accurate surface 71 which is in contact with the interior surface of the said accurate alignment receptacle 61 such that after perpendicular alignment is provided, the vertical adjustment screws 2 are utilized to tighten the guide alignment base 7 into stable position; the said guide B utilizes a set screw 64 inserted into the said passage 611 that is fastened to the said threaded hole 72 and tightened against the guide B, enabling the exact positioning of the guide B at the degree of perpendicularity, thereby effectively achieving easier adjustment and a shorter adjustment period.

Referring to FIG. 4 and FIG. 8, the said two embodiments of the vertical holes 112 and 73 have filleted corners 1121 and 731 along their edges and accurate surfaces 21 that match the filleted corners 1121 and 731 are disposed along the lower extent of the said vertical adjustment screws 2 such that when the vertical adjustment screws 2 are inserted into the vertical holes 112 and 73 and, furthermore, fastened to the guide alignment base 4 or the guide mounting plate 6 vertical threaded holes 43 or 63 and then subjected to the vertical adjustment screws 2 at four directions during minor forward and backward adjustment; as the said guide alignment base 4 and 7 is capable of slight angular variation, the said accurate surfaces 21 following the angular variation continuously because surface contact is maintained with the said filleted corners 1121 and 731, thereby enabling increased vertical adjustment screw 2 tightness.

In summation of the foregoing section, since the invention herein is a most simplified structure that integrates perpendicularity adjustment and horizontal positioning to strengthen guide alignment base and, furthermore, is capable of reducing adjustment period and thereby achieves optimal utility, the present invention meets the new patent requirements of progressiveness and originality and is submitted to the patent bureau for review and the granting of the commensurate patent rights.

The invention claimed is:

1. A guide alignment base structure for an elevating base comprising:
   a) a guide base having a guide connected thereto;
   b) an alignment base having:
      I) a first end connected at a top thereof to the elevating base;
      ii) a second end adjustably connected directly to the guide base; and
   c) four vertical adjustment screws, the guide base having four vertical threaded holes equally spaced apart and forming a rectangular pattern, the alignment base having four vertical holes equally spaced apart and forming a rectangular pattern, each of the four vertical holes aligning with one of the four vertical threaded holes and adjustably connected thereto by one of the four vertical adjustment screws,
   wherein the guide base has a predetermined portion inserted into the alignment base.

2. The guide alignment base structure according to claim 1, wherein the alignment base having:
   I) two recesses, one of the two recesses is located on a bottom of each of the first and the second ends, each of the two recesses having a U-shaped cross section; and
   ii) a middle section located between the two recesses and connected to two sides thereof.

3. The guide alignment base structure according to claim 2, further comprising three horizontal adjustment screws, the alignment base has three horizontal threaded holes, one of the three horizontal threaded holes is located in each of the two sides and the middle section, the three horizontal adjustment screws are threadedly inserted through the three horizontal threaded holes engaging three sides of the guide base.

4. The guide alignment base structure according to claim 2, further comprising a positioning block having a first end connected to the alignment base and a second end connected to the guide base.

5. The guide alignment base structure according to claim 4, wherein the positioning block is located on a top of the guide base and the second end of the alignment base.

6. The guide alignment base structure according to claim 1, wherein each of the four vertical holes has a filleted peripheral edge, each of the four vertical adjustment screws has an accurate surface matching the filleted peripheral edge of one of the four vertical holes.

7. The guide alignment base structure according to claim 1, further comprising a spherical body, the guide base having a locating seat located between the guide base and the alignment base, the spherical body is located in the locating seat and at a position equally spaced from the four vertical adjustment screws.

8. The guide alignment base structure according to claim 1, wherein the alignment base having an accurate alignment receptacle, the guide base having an aligning accurate surface aligning with and engaging the accurate alignment receptacle.

9. The guide alignment base structure according to claim 8, wherein each of the four vertical holes has a filleted peripheral edge, each of the four vertical adjustment screws has an accurate surface matching the filleted peripheral edge of one of the four vertical holes.

10. The guide alignment base structure according to claim 8, wherein the aligning accurate surface has a curved shape matching a curved shape of the accurate alignment receptacle.

11. The guide alignment base structure according to claim 1, further comprising a set screw locking the guide in a predetermined position.

* * * * *